US010014756B2

(12) United States Patent
Horiba et al.

(10) Patent No.: US 10,014,756 B2
(45) Date of Patent: Jul. 3, 2018

(54) METHOD FOR MANUFACTURING INTERPHASE INSULATING SHEET OF ROTATING ELECTRIC MACHINE, AND ELECTRIC COMPRESSOR

(71) Applicant: KABUSHIKI KAISHA TOYOTA JIDOSHOKKI, Kariya-shi, Aichi-ken (JP)

(72) Inventors: Tatsuya Horiba, Aichi-ken (JP); Shinichi Okuyama, Aichi-ken (JP); Taizo Hirano, Aichi-ken (JP); Minoru Mera, Aichi-ken (JP); Hiroshi Fukasaku, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 481 days.

(21) Appl. No.: 14/337,615

(22) Filed: Jul. 22, 2014

(65) Prior Publication Data

US 2015/0028712 A1 Jan. 29, 2015

(30) Foreign Application Priority Data

Jul. 23, 2013 (JP) .................................. 2013-152558

(51) Int. Cl.
*H02K 15/10* (2006.01)
*B29C 65/00* (2006.01)
(Continued)

(52) U.S. Cl.
CPC .............. *H02K 15/10* (2013.01); *B29C 65/08* (2013.01); *B29C 66/21* (2013.01); *H02K 3/34* (2013.01);
(Continued)

(58) Field of Classification Search
CPC ... B29C 65/08; B29C 66/24221; B29C 66/21; B32B 2310/028; F16C 2226/38; H02K 15/10; H02K 15/105; H02K 3/38
See application file for complete search history.

(56) References Cited

U.S. PATENT DOCUMENTS 8,456,054 B2 6/2013 Mera et al.
2008/0174197 A1* 7/2008 Fukasaku .................. H02K 3/34
310/184
(Continued)

FOREIGN PATENT DOCUMENTS

JP 6-79784 A 3/1994
JP 2006-264699 A 10/2006
(Continued)

OTHER PUBLICATIONS

Communication dated Apr. 16, 2015 from the Japanese Patent Office in counterpart Application No. 2013-152558.

*Primary Examiner* — Christopher T Schatz
(74) *Attorney, Agent, or Firm* — Sughrue Mion, PLLC (57) ABSTRACT

An overlapping portion of an insulating portion formed in an annular shape is held between a workbench having a linear projection and an ultrasonic horn having a circular projection with at least part of the linear projection and of the circular projection opposed to each other and ultrasonically welded. In the ultrasonic welding, even though the ultrasonic horn under ultrasonic vibration rotates on the overlapping portion of the insulating portion, the area in the overlapping portion held between the linear projection and the circular projection with at least part of the linear projection and of the circular projection opposed to each other is not reduced after ultrasonic vibration is applied to the ultrasonic horn.

5 Claims, 6 Drawing Sheets (51) Int. Cl.
*B29C 65/08* (2006.01)
*H02K 3/38* (2006.01)
*H02K 7/14* (2006.01)
*H02K 3/34* (2006.01)

(52) U.S. Cl.
CPC ............. *H02K 3/38* (2013.01); *H02K 7/14* (2013.01); *H02K 15/105* (2013.01); *Y10T 29/49009* (2015.01)

(56) References Cited

U.S. PATENT DOCUMENTS

2009/0079292 A1\* 3/2009 Horiba .................. H02K 3/34
  310/215
2011/0012475 A1 1/2011 Mera et al.
2012/0097339 A1\* 4/2012 Hull ..................... B29C 65/08
  156/580.1

FOREIGN PATENT DOCUMENTS

| JP | 2009-077582 A | 4/2009 |
| JP | 2011-24310 A | 2/2011 |
| KR | 10-1114817 B1 | 2/2012 |

\* cited by examiner

FIG. 9

METHOD FOR MANUFACTURING INTERPHASE INSULATING SHEET OF ROTATING ELECTRIC MACHINE, AND ELECTRIC COMPRESSOR

BACKGROUND OF THE INVENTION

The present invention relates to a method for manufacturing an interphase insulating sheet of a rotating electric machine, and an electric compressor.

Japanese Unexamined Patent Application Publication No. 2009-77582 discloses an interphase insulating sheet (interphase insulating paper) of a rotating electric machine that is interposed between any two coil ends of U-, V-, and W-phase coils to insulate such coil ends from each other. The interphase insulating sheet disclosed in the above publication includes a pair of insulating portions that insulate coils of different phases from each other and a plurality of bridge pieces that is inserted in slots between adjacent teeth formed in a stator core and connects the pair of insulating portions to each other. Each of the insulating portions of a strip shape is formed in an annular shape by overlapping opposite ends thereof with each other and welding the overlapping portion by ultrasonic welding.

An ultrasonic welding apparatus used to weld the overlapping portion of each insulating portion includes a ferrous workbench and an ultrasonic horn. In the ultrasonic welding, the overlapping portion of the insulating portion is first placed on the upper surface of the workbench and then the ultrasonic horn is placed on the upper surface of the overlapping portion. The overlapping portion held between the workbench and the ultrasonic horn is ultrasonically welded.

The U-phase coil is passed through a first group of slots and the V-phase coil is passed through a second group of slots. At this time, the bridge pieces of the interphase insulating sheet insulating coil ends of the U-phase coil from coil ends of the V-phase coil are inserted in the second group of slots. By so doing, the pair of insulating portions interposed between the coil ends of the U-phase coil and the coil ends of the V-phase coil insulates the coil ends of the U-phase coil from the coil ends of the V-phase coil.

Subsequently, the W-phase coil is passed through a third group of slots. At this time, the bridge pieces of the interphase insulating sheet insulating the coil ends of the V-phase coil from coil ends of the W-phase coil are inserted in the third group of slots. With this configuration, the pair of insulating portions interposed between the coil ends of the V-phase coil and the coil ends of the W-phase coil insulate the coil ends of the V-phase coil from the coil ends of the W-phase coil.

The opposite ends of each insulating portion are overlapped with each other in the overlapping portion of the insulating portion. The overlapping portion is less flexible as compared with the remaining part of the insulating portion. In is other words, the insulating portion is harder to bend at the overlapping portion. For example, in the case that the insulating portion which insulates the coil ends of the U-phase coil from the coil ends of the V-phase coil is inserted through the third group of slots, the overlapping portion of the insulating portion, which is poor in flexibility, may interfere with the W-phase coil during the insertion of the W-phase coil in the third group of slots, thus hampering the insertion of the W-phase coil. For this reason, it is preferable that the distance of the overlapping portions in the extending direction of the insulating portions should be as small as possible.

The weld area in the overlapping portion in the extending direction of the insulating portion decreases with a decrease of the distance of the overlapping portion in the extending direction of the insulating portion. In order to increase the weld area, it may be contemplated to use an ultrasonic horn having a rectangular shape in a plan view and to place the ultrasonic horn on the upper surface of the overlapping portion so that the longitudinal direction of the bottom surface of the ultrasonic horn is oriented in the direction in which the bridge pieces extend.

However, in the ultrasonic welding process, the ultrasonic horn rotates on the overlapping portion of the insulating portion while applying ultrasonic vibration. The rotation of the ultrasonic horn on the overlapping portion may cause part of the edges of the overlapping portion at the opposite longitudinal ends thereof to be moved out of the overlapping portion. As a result, the area in the overlapping portion that is held between the workbench and the ultrasonic horn is reduced after ultrasonic vibration is applied to the ultrasonic horn, with the result that stable ultrasonic welding fails to be achieved and the welding strength in the overlapping portion is lowered.

The present invention, which has been made in view of the above circumstances, is directed to a method for manufacturing an interphase insulating sheet of a rotating electric machine that ensures welding strength in the overlapping portion of the insulating portion, and also to an electric compressor.

SUMMARY OF THE INVENTION

To solve the above problem in accordance with an aspect of the present invention, there is provided a method for manufacturing an interphase insulating sheet of a rotating electric machine. The rotating electric machine is provided with a stator core and coils. The stator core has opposite ends in the axial direction thereof, a plurality of teeth and slots formed between adjacent teeth. The coils are inserted in the slots by wave winding and have coil ends extending out from the opposite ends of the stator core. The interphase insulating sheet of the rotating electric machine includes a pair of insulating portions providing phase-to-phase insulation between the coil ends and a plurality of bridge pieces each inserted in one of the slots and provided between the pair of insulating portions so as to connect therebetween. Each insulating portion is of a strip shape and formed in an annular shape having an overlapping portion where the opposite ends of the insulating portion are located in an overlapping manner. The method for manufacturing an interphase insulating sheet of a rotating electric machine includes the steps of holding the overlapping portion between a workbench having a linear projection and an ultrasonic horn having a circular projection with at least part of the linear projection and of the circular projection opposed to each other and ultrasonically welding the overlapping portion.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages

DETAILED DESCRIPTION OF THE EMBODIMENTS

The following will describe the embodiment embodying the present invention with reference to FIGS. 1 to 9. Referring to FIG. 1A, numeral 10 designates an electric scroll type compressor including a rotating electric machine M, a movable scroll 15 and a motor housing 14. The rotating electric machine M of the electric compressor 10 includes a rotary shaft 12, a rotor 11 fixedly mounted on the rotary shaft 12, and a stator 13 held by the inner peripheral surface of the motor housing 14. The compression operation body includes a movable scroll 15, and a fixed scroll 16. The movable scroll 15 is configured to orbit about the axis of the rotary shaft 12 with rotation of the rotary shaft 12 and serves as the compression member of the present invention. With the orbiting motion of the movable scroll 15, compression chambers 17 formed between the movable scroll 15 and the fixed scroll 16 moves radially inwardly while reducing their volumes.

Figure 1A:
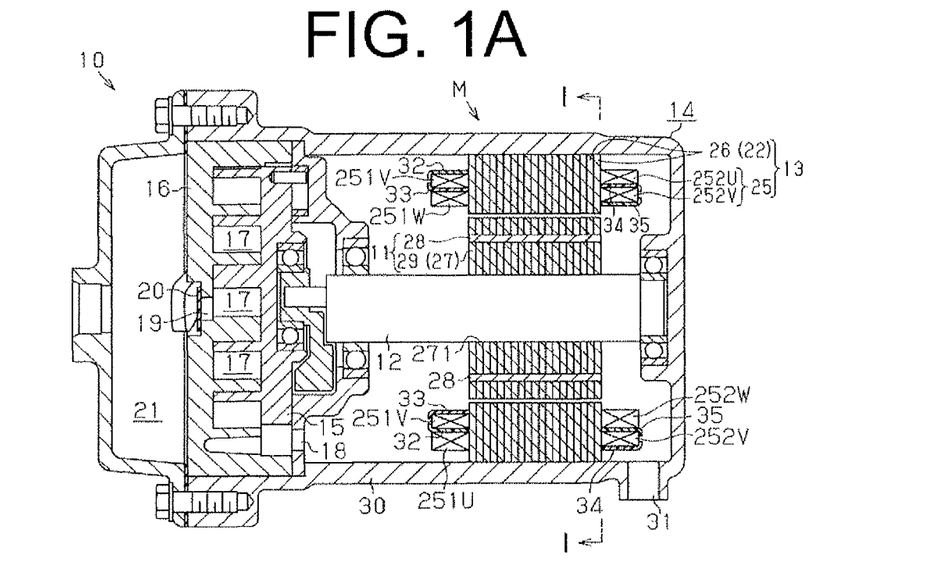
FIG. 1A is a longitudinal cross-sectional view showing an electric compressor according to the embodiment of the present invention.

An introduction port 31 is formed through a peripheral wall 30 of the motor housing 14. The introduction port 31 is connected to an external refrigerant circuit (not shown). In operation of the compressor 10, refrigerant gas is introduced into the motor housing 14 from the external refrigerant circuit via the introduction port 31. The refrigerant gas introduced into the motor housing 14 is flowed through passages 141 (see FIG. 2) which are provided between the inner peripheral surface of the motor housing 14 and the outer peripheral surface of the stator 13 and then drawn into the compression chambers 17 through a suction port 18 (FIG. 1) by orbiting motion of the movable scroll 15 (suction operation). The refrigerant gas in the compression chambers 17 is compressed by reduction of the compression chambers 17 caused by the orbiting motion of the movable scroll 15 (discharge operation), and then discharged into a discharge chamber 21 through a discharge port 19 while pushing open a discharge valve 20. The refrigerant gas in the discharge chamber 21 flows out into the external refrigerant circuit and returns to the motor housing 14 of the compressor 10.

Figure 2:
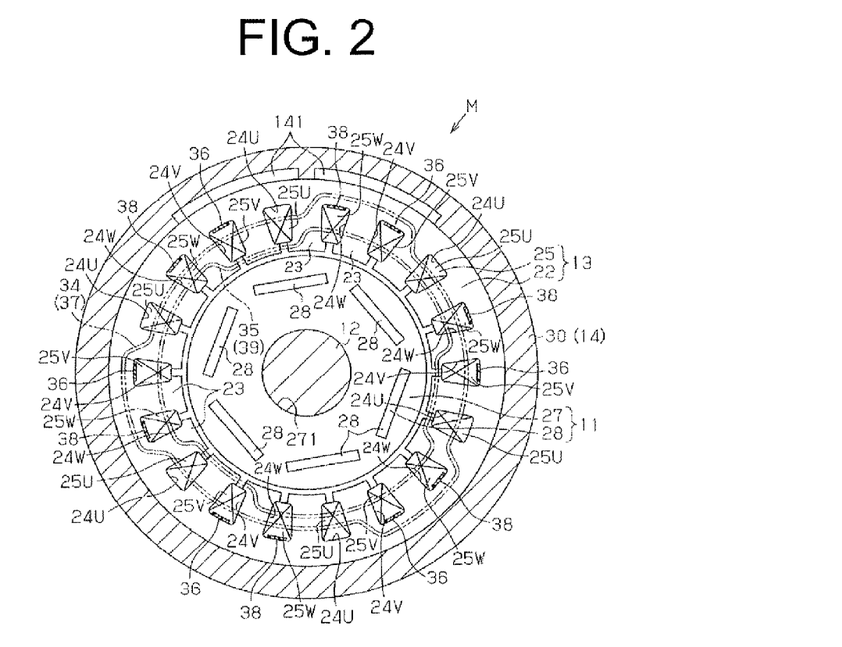
FIG. 2 is a transverse cross-sectional view taken along line I-I in FIG. 1A.

As shown in FIG. 2, the stator 13 of the rotating electric machine M includes an annular stator core 22 having a plurality of teeth 23 formed along the inner circumference of the stator core 22 and a plurality of slots 24U, 24V, 24W formed between the adjacent teeth 23, and coils 25 which are of different phases and inserted in the slots 24U, 24V, 24W. In the present embodiment, the number of the teeth 23 and hence the number of the slots 24U, 24V, 24W is eighteen. The slots 24U, 24V, 24W are spaced equidistantly in the circumferential direction of the annular stator 13.

As shown in FIG. 1A, the stator core 22 is formed by laminating a plurality of core plates 26 made of magnetic material (steel plate). The rotor 11 includes a rotor core 27 and permanent magnets 28 embedded in the rotor core 27. The rotor core 27 is formed by laminating a plurality of core plates 29 made of magnetic material (steel plate). The rotor core 27 has in the center thereof a shaft hole 271, which is a through hole, and the rotary shaft 12 is passed through the shaft hole 271 and secured to the rotor core 27.

Figure 3:
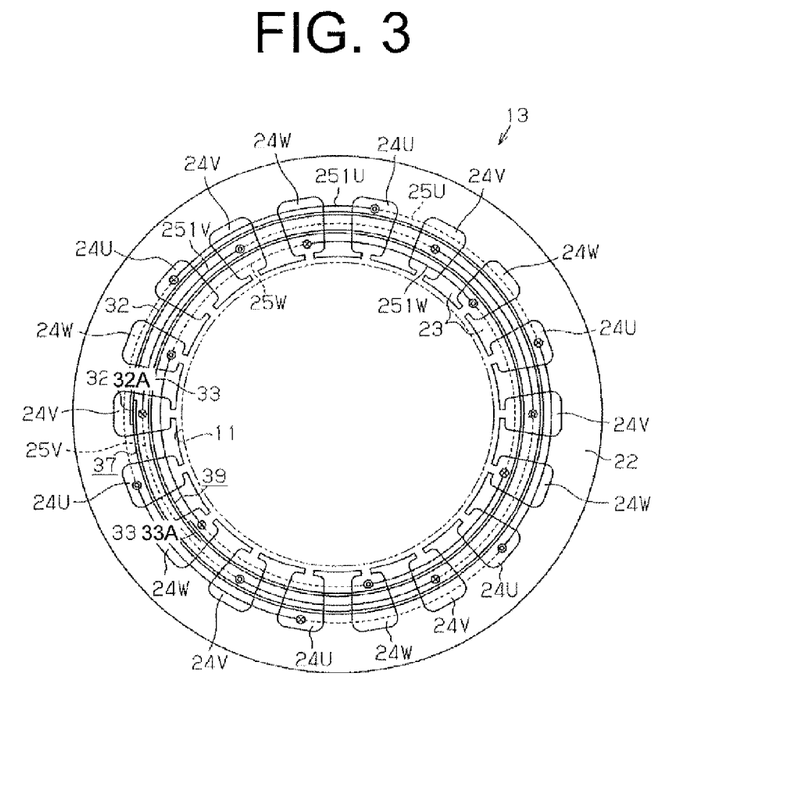
FIG. 3 is an explanatory schematic view illustrating the wave winding.

FIG. 3 is a schematic view showing the stator 13 as viewed from the front side. It is noted that the left side of the compressor 10 in FIG. 1A is the front side and the right side the rear side, respectively. The coils 25 inserted in the slots 24U, 24V, 24W are wound by wave winding. The coils 25 in the slots 24U, 24V, 24W are disposed separated from the teeth 23 by insulating sheets (not shown).

A U-phase coil 25U is passed through a first group of slots 24U, a V-phase coil 25V is passed through a second group of slots 24V, and a W-phase coil 25W is passed through a third group of slots 24W. In FIG. 3, part of the respective phase coils 25U, 25V, 25W shown by solid lines are disposed above end face of the stator core 22 that is on the front side of the stator 13. Part of the respective phase coils 25U, 25V, 25W shown by broken lines are disposed above the other end face of the stator core 22 that is on the rear side of the stator 13. Part of the respective phase coils 25U, 25V, 25W connecting between the solid line and the broken line are disposed passing through the associated slots 24U, 24V, 24W.

The U-phase coil 25U has first coil ends 251U as the coil ends of the U-phase coil 25U extending out from the slots 24U on the front side of the stator 13 and the V-phase coil 25V has first coil ends 251V as the coil ends of the V-phase coil 25V extending out from the slots 24V on the front side of the stator 13. A first insulating portion 32 as the insulating portion is interposed between the first coil ends 251U and the first coil ends 251V so as to extend around the rotor 11. The V-phase coil 25V has the first coil ends 251V extending out from the slots 24V on the front side of the stator 13 and the W-phase coil 25W has first coil ends 251W as the coil ends of the W-phase coil 25W extending out from the slots 24W on the front side of the stator 13. A first insulating portion 33 as the insulating portion is interposed between the first coil ends 251V and the first coil ends 251W so as to extend around the rotor 11. The first insulating portion 32 is disposed radially outward of the first insulating portion 33. Specifically, the first insulating portion 33 on the radially inner side is disposed so as to be surrounded by the first insulating portion 32. The first insulating portion 32 and the first insulating portion 33 are both made of a synthetic resin.

Figure 4:
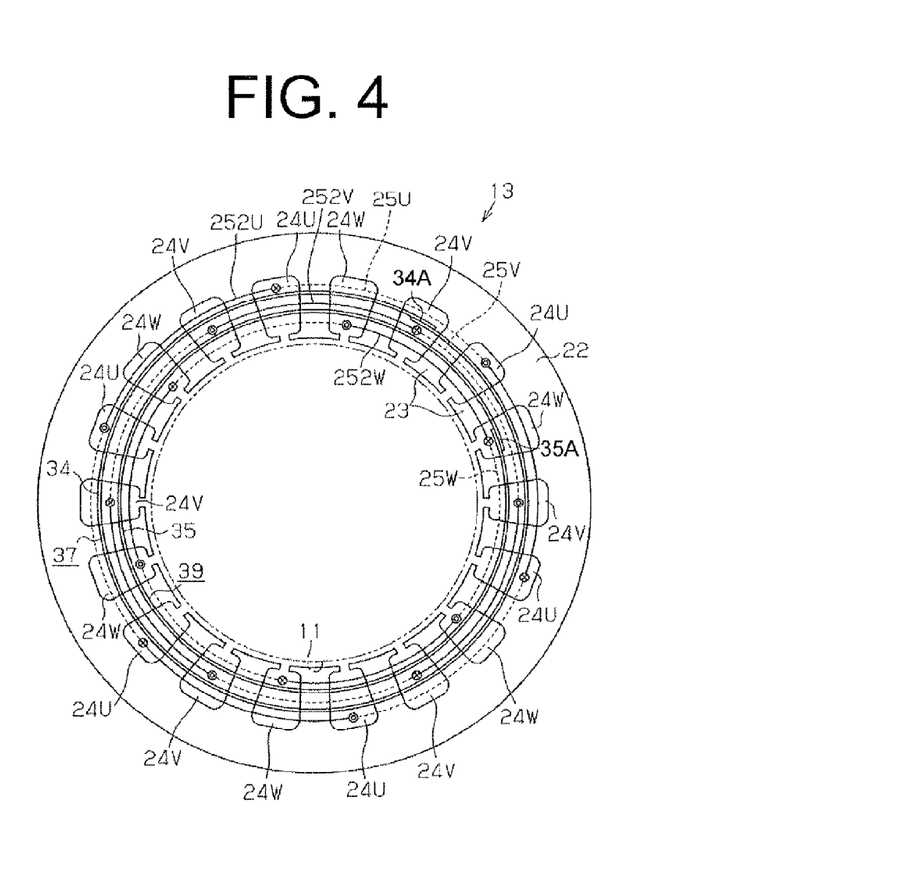
FIG. 4 is also an explanatory schematic view illustrating the wave winding.

FIG. 4 is a schematic view showing the stator 13 as viewed from the rear side. Part of the respective phase coils 25U, 25V, 25W shown by solid lines are disposed on the rear end face of the stator core 22. Part of the respective phase coils 25U, 25V, 25W shown by broken lines are disposed on the front end face of the stator core 22.

The U-phase coil 25U has second coil ends 252U as the coil ends of the U-phase coil 25U extending out from the slots 24U on the rear side of the stator 13 and the V-phase coil 25V has second coil ends 252V as the coil ends of the V-phase coil 25V extending out from the slots 24V on the rear side of the stator 13. A second insulating portion 34 as the insulating portion is interposed between the second coil ends 252U and the second coil ends 252V so as to extend around the rotor 11. The V-phase coil 25V has the second coil ends 252V extending out from the slots 24V on the rear side of the stator 13 and the W-phase coil 25W has second coil ends 252W as the coil ends of the W-phase coil 25W extending out from the slots 24W on the rear side of the stator 13. A second insulating portion 35 as the insulating portion is interposed between the second coil ends 252V and the second coil ends 252W so as to extend around the rotor 11. The second insulating portion 34 is arranged radially outward of the second insulating portion 35. Specifically, the second insulating portion 35 on the radially inner side is disposed so as to be surrounded by the second insulating portion 34. The second insulating portion 34 and the second insulating portion 35 are both made of a synthetic resin.

Figure 1B:
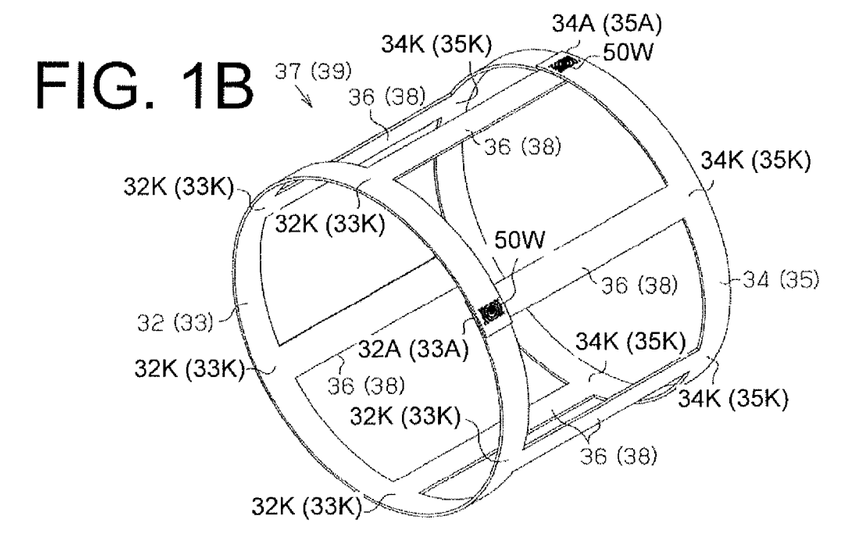
FIG. 1B is a perspective view showing an interphase insulating sheet provided in the compressor of FIG. 1A.

As shown in FIG. 1B, the first insulating portion 32 and the second insulating portion 34 are connected by a plurality of bridge pieces 36 (six pieces in the embodiment). Among the six bridge pieces 36, two bridge pieces 36 are formed to be longer than the remaining four bridge pieces 36. One of the longer bridge pieces 36 is formed integrally with the first insulating portion 32, and the other of the longer bridge pieces 36 is formed integrally with the second insulating portion 34. The remaining four shorter bridge pieces 36 are formed integrally with the first and second insulating portions 32, 34. The opposite ends of the first insulating portion 32 are overlapped with each other with for a predetermined distance. The portion where the opposite ends of the first insulating portion 32 are overlapped with each other is ultrasonically welded to thereby form an overlapping portion 32A. It is to be noted that, in the present embodiment, each of the longer bridge pieces 36 is overlapped at one end thereof with the overlapping portion 32A and ultrasonically welded. The distance for which the opposite ends of the first insulating portion 32 overlap with each other in the extending direction of the first insulating portion 32 is greater than the width of the bridge pieces 36. The same is true for the second insulating portion 34.

As shown in FIG. 2, the bridge pieces 36 are inserted in the respective slots 24V in which the V-phase coil 25V is inserted. The first insulating portion 32, the second insulating portion 34 and the bridge pieces 36 cooperate to constitute an interphase insulating sheet 37 that provides phase-to-phase insulation between the coil ends of the coils 25. In the slots 24V, the bridge pieces 36 are pressed radially outward against the stator 13 by the V-phase coil 25V so that the interphase insulating sheet 37 is positioned in place.

As shown in FIG. 1B, the first insulating portion 33 and the second insulating portion 35 are connected by a plurality of bridge pieces 38 (six pieces in the embodiment, see FIG. 2). Among the six bridge pieces 36, two bridge pieces are formed to be longer than the remaining four bridge pieces 36. One of the longer bridge pieces 36 is formed integrally with the first insulating portion 32, and the other of the longer bridge pieces 36 is formed integrally with the second insulating portion 34. The remaining four shorter bridge pieces 36 are formed integrally with the first and second insulating portions 32, 34. The opposite ends of the first insulating portion 32 are overlapped with each other for a predetermined distance. The portion where the opposite ends of the first insulating portion 32 are overlapped with each other is ultrasonically welded to thereby form an overlapping portion 32A. It is to be noted that, in the present embodiment, each of the longer bridge pieces 36 is overlapped at one end thereof with the overlapping portion 32A and ultrasonically welded. The distance for which the opposite ends of the first insulating portion 33 overlap with each other in the extending direction of the first insulating portion 33 is greater than the width of the bridge pieces 38. The same is true for the second insulating portion 35.

As shown in FIG. 2, the bridge pieces 38 are inserted in the respective slots 24W in which the W-phase coil 25W is inserted. The first insulating portion 33, the second insulating portion 35 and the bridge pieces 38 cooperate to constitute an interphase insulating sheet 39 that provides phase-to-phase insulation between the coil ends of the coils 25 from each other. In the slots 24W, the bridge pieces 38 are pressed radially outward against the stator 13 by the W-phase coil 25W so that the interphase insulating sheet 39 is positioned in place.

The interphase insulating sheet 39 and the interphase insulating sheet 37 are of substantially the same configuration. Therefore, the following description will focus only on the interphase insulating sheet 37. Furthermore, the overlapping portion 32A of the first insulating portion 32 and the overlapping portion 34A of the second insulating portion 34 also have substantially the same configuration. Therefore, in the following description, only the overlapping portion 32A of the first insulating portion 32 will be described.

Figure 5:
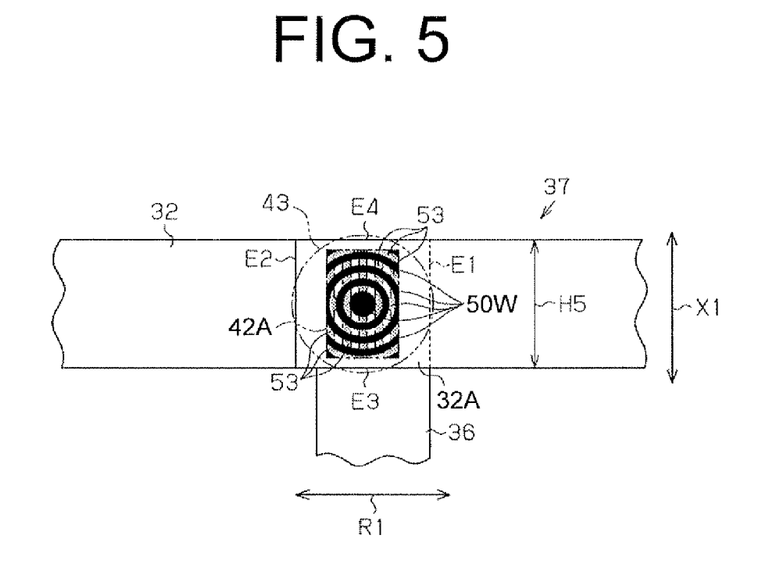
FIG. 5 is an unfolded view of a part of the interphase insulating sheet as viewed from the outer peripheral side thereof.

As shown in FIG. 5, the overlapping portion 32A has on the outer peripheral surface thereof a plurality of concentric circular markings each representing a solidified portion 50W. The solidified portions 50W, some of which are in the form of an incomplete circle, are formed of part of the first insulating portion 32 which is melted and solidified. In the overlapping portion 32A, a plurality of weld portions 53 (indicated by hatching in FIG. 5) are formed on the contact surface between the opposite ends of the first insulating portion 32. In FIG. 5, the overlapping portion 32A of the first insulating portion 32 is delimited by four side edges, namely side edges E1, E2 that are located at the opposite ends of the first insulating portion 32 and spaced apart from each other in the extending direction of the first insulating portion 32 (or the arrow direction R1 in FIG. 5), and side edges E3, E4, or the part of the opposite side edges of the first insulating portion 32 that extend between the side edges E1, E2 and spaced apart from each other in the extending directions of the bridge pieces 36 (or the arrow direction X1 in FIG. 5). The weld portions 53 are located within the overlapping portion 32A at a weld area that is spaced inwardly from the respective delimiting side edges E1, E2, E3 and E4 at predetermined distances. Therefore, the area of the overlapping portion 32A less the weld area including the weld portions 53 is a non-weld area. In other words, a non-weld area is provided in the peripheral area of the overlapping portion 32A. The fist insulating portion 32 is formed in an annular shape by connecting the opposite ends thereof at the overlapping portion 32A by the weld portions 53.

Figure 6:
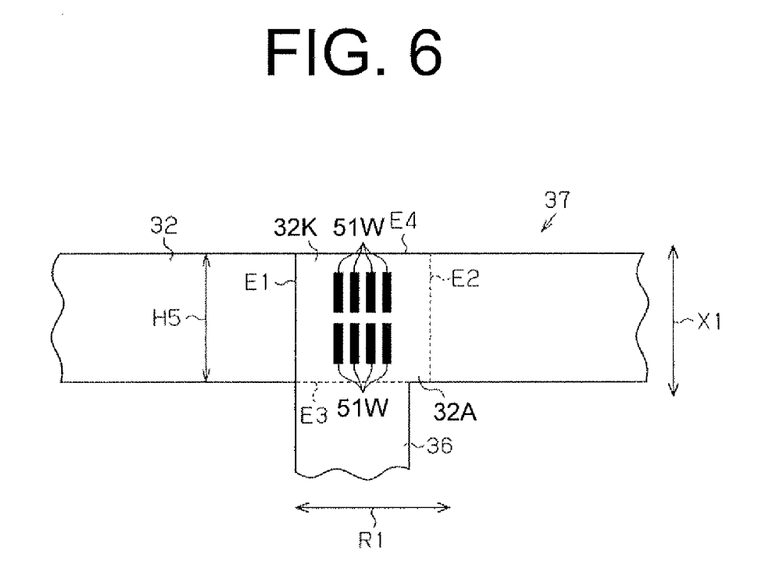
FIG. 6 is an unfolded view of a part of the interphase insulating sheet as viewed from the inner peripheral side thereof.

As shown in FIG. 6, the overlapping portion 32A has on the inner peripheral surface thereof a plurality of linear markings each representing a solidified portion 51W that is formed of part of the first insulating portion 32 which is melted and then solidified thereby to form a weld. The solidified portions 51W are oriented to extend parallel to each other in the extending directions of the bridge pieces 36 (or the arrow direction X1 in FIG. 6).

Figure 7:
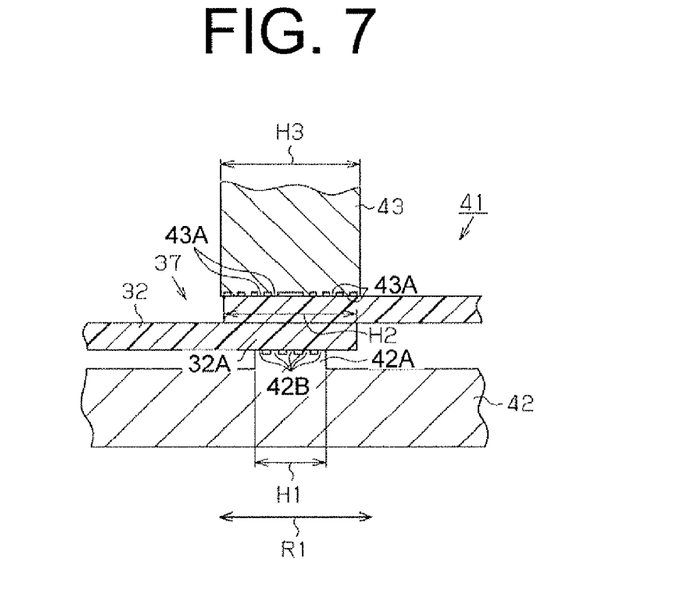
FIG. 7 is a cross-sectional view showing an ultrasonic welding apparatus.

FIG. 7 shows an ultrasonic welding apparatus 41 used to ultrasonically weld the overlapping portion 32A of the interphase insulating sheet 37. The ultrasonic welding apparatus 41 includes a ferrous workbench 42 and a cylindrical ultrasonic horn 43. The workbench 42 has on the upper surface thereof an anvil portion 42A formed integrally with the workbench 42. In FIG. 7, the width H1 of the anvil portion 42A as measured in the extending direction of the first insulating portion 32 is smaller than the overlapping distance H2 of the overlapping portion 32A as measured in the extending direction of the first insulating portion 32. The outer diameter H3 of the ultrasonic horn 43 as measured in the extending direction of the first insulating portion 32 is greater than the overlapping distance H2 of the overlapping portion 32A as measured in the extending direction of the first insulating portion 32.

Figure 8:
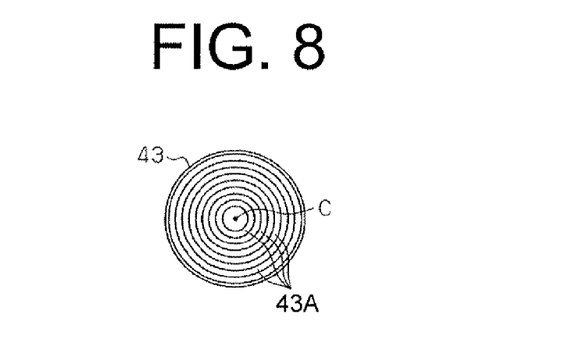
FIG. 8 is an end view of an ultrasonic horn.

FIG. 8 shows an end face of the ultrasonic horn 43 that is to be opposed to the overlapping portion 32A. The end face of the ultrasonic horn 43 has a plurality of circular projections 43A of different diameters that are concentric about the center C of the ultrasonic horn 43. Each circular projection 43A has a flat end face.

Figure 9:
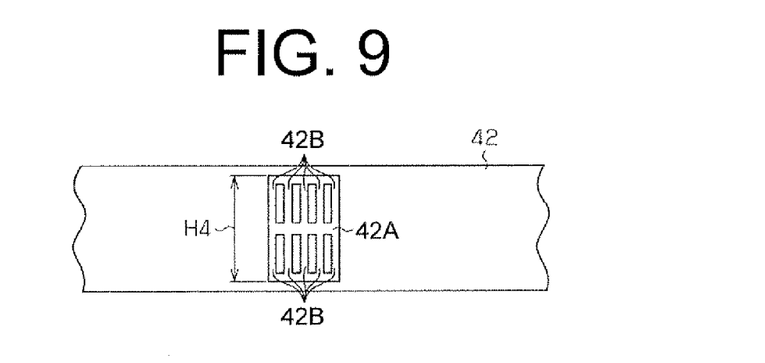
FIG. 9 is a plan view of a workbench.

As shown in FIG. 9, the anvil portion 42A of the workbench 42 has on the upper surface thereof a plurality of linear projections 42B formed so as to extend in the direction along the bridge pieces 36. In FIG. 9, the width H4 of the anvil portion 42A as measured in the extending direction of the linear projections 42B is smaller than the width H5 (see FIG. 5) of the overlapping portion 32A (or the first insulating portion 32) as measured in the direction along the bridge pieces 36.

The following will describe a method for manufacturing the interphase insulating sheet 37 with the ultrasonic welding apparatus 41 with reference to FIG. 7. As shown in the drawing, the first insulating portion 32 is first placed on the anvil portion 42A of the workbench 42 so that the inner peripheral surface of the overlapping portion 32A is opposed to the workbench 42.

As described above, the width H1 of the anvil portion 42A of the workbench 42 as measured in the extending direction of the first insulating portion 32 is smaller than the overlapping distance H2 of the overlapping portion 32A as measured in the extending direction of the first insulating portion 32. Therefore, the inner peripheral surface of the overlapping portion 32A is placed on the anvil portion 42A in such a way that the opposite side edges E1, E2 of the first insulating portion 32 spaced in the extending direction of the first insulating portion 32 are positioned outside the anvil portion 42A. The width H4 of the anvil portion 42A as measured in the extending direction of the linear projections 42B is smaller than the width H5 of the overlapping portion 32A as measured in the extending directions of the bridge pieces 36. Therefore, the inner peripheral surface of the overlapping portion 32A is placed on the anvil portion 42A in such a way that the opposite side edges E3, E4 spaced in the extending directions of the bridge pieces 36 are positioned outside the linear projections 42B extending along the extending direction of the bridge pieces 36. Specifically, the overlapping portion 32A and the part of the surface of the anvil portion 42A that is in contact with the overlapping portion 32A are opposed to each other.

In other words, the overlapping portion 32A is placed on the anvil portion 42A so that the aforementioned non-weld area is provided in the peripheral area of the overlapping portion 32A around the weld portions 53. The overlapping portion 32A is placed on the anvil portion 42A so that the linear projections 42B are oriented along the extending direction of the bridge pieces 36.

Subsequently the ultrasonic horn 43 is placed on the outer peripheral surface of the overlapping portion 32A with the center C of the ultrasonic horn 43 coinciding with the center of the overlapping portion 32A. Then the overlapping portion 32A is held between the anvil portion 42A of the workbench 42 and the ultrasonic horn 43 having the circular projections 43A with at least part of the linear projections 42B on the anvil portion 42A of the workbench 42 and of the circular projections 43A on the ultrasonic horn 43 opposed to each other.

The outer peripheral surface of the overlapping portion 32A is pressed against the circular projections 43A by the ultrasonic vibration of the ultrasonic horn 43. Then the heat generated by the ultrasonic vibration of the ultrasonic horn 43 melts part of the overlapping portion 32A which is opposed to the linear projections 42B or the circular projections 43A, thereby forming the weld portions 53. Part of the melted first insulating portion 32 is allowed to flow between the linear projections 42B and also between the circular projections 43A and to solidify thereby to form the plurality of linear solidified portions 51W on the inner peripheral surface of the overlapping portion 32A and the plurality of concentric circular solidified portions 50W on the outer peripheral surface of the overlapping portion 32A. The first insulating portion 32 is thus ultrasonically welded at the overlapping portion 32A. The overlapping portion 33A of the first insulating portion 33 is also ultrasonically welded, with the result that the annular interphase insulating sheet 37 is completed.

As described above, the inner peripheral surface of the overlapping portion 32A is placed on the anvil portion 42A so that the opposite side edges E1, E2 spaced in the extending direction of the first insulating portion 32 are positioned outside the anvil portion 42A. Specifically, the overlapping portion 32A and the part of the surface of the anvil portion 42A that is in contact with the overlapping portion 32A are opposed to each other. Furthermore, the inner peripheral surface of the overlapping portion 32A is placed on the anvil portion 42A so that the opposite side edges E3, E4 spaced in the extending directions of the bridge pieces 36 are positioned outside the linear projections 42B. Therefore, the weld portions 53 are located within the overlapping portion 32A at the weld area that is spaced inwardly from the respective side edges E1, E2, E3 and E4 at predetermined distances.

The following will describe the effects of the embodiment. In the ultrasonic welding of the overlapping portion 32A of the first insulating portion 32, the ultrasonic horn 43 under ultrasonic vibration rotates on the overlapping portion 32A. However, the area in the overlapping portion 32A held between the linear projections 42B and the circular projections 43A with at least part of these projections opposed to each other is not reduced after ultrasonic vibration is applied to the ultrasonic horn 43. Therefore, the ultrasonic welding of the overlapping portion 32A is performed with stability, which ensures the welding strength of the overlapping portion 32A.

The part of the first insulating portion 32 which is melted in the process of ultrasonically welding the overlapping portion 32A of the first insulating portion 32 flows between the linear projections 42B and the circular projections 43A and then solidifies. Therefore, the melted part of the first insulating portion 32 is prevented from forming a burr.

The weld portions 53 are located within the overlapping portion 32A at the weld area that is spaced inwardly from the side edges E1, E2, E3 and E4 at predetermined distances. In other words, in the overlapping portion 32A, the opposite side edges E1, E2 spaced in the extending direction of the first insulating portion 32 and the opposite side edges E3, E4 spaced in the extending directions of the bridge pieces 36 constitute part of the non-weld area in which no weld portion 53 is present. As a result, the first insulating portion 32A is less susceptible to breakage at the opposite side edges E1, E2 spaced in the extending direction of the first insulating portion 32 or the opposite side edges E3, E4 spaced in the extending directions of the bridge pieces 36.

The opposite ends of the first insulating portion 32 are overlapped with each other for a predetermined distance. The portion where the opposite ends of the first insulating portion 32 are overlapped with each other is ultrasonically welded to thereby form an overlapping portion 32A. It is to be noted that, in the present embodiment, each of the longer bridge pieces 36 is overlapped at one end thereof with the overlapping portion 32A and ultrasonically welded. Therefore, the overlapping portion 32A has a higher strength as compared with the overlapping portion 32A formed at a different position in the first insulating portion 32.

The above embodiment of the present invention offers the following operation.

(1) In the ultrasonic welding operation, the overlapping portion 32A is held between the workbench 42 having the linear projections 42B and the ultrasonic horn 43 having the circular projections 43A with at least part of the linear projections 42B of the workbench 42 and of the circular projections 43A of the ultrasonic horn 43 opposed to each other. In the ultrasonic welding of the overlapping portion 32A of the first insulating portion 32, even though the ultrasonic horn 43 under ultrasonic vibration rotates on the overlapping portion 32A, the area in the overlapping portion 32A held between the linear projections 42B and the circular projections 43A with at least part of these projections opposed to each other is not reduced after ultrasonic vibration is applied to the ultrasonic horn 43, with the result that the ultrasonic welding of the overlapping portion 32A is performed with stability and, therefore, the welding strength of the overlapping portion 32A is achieved.

(2) The overlapping portion 32A is ultrasonically welded while being held between the plurality of linear projections 42B and the plurality of concentric circular projections 43A with at least part of these projections opposed to each other. By so doing, the area in which the plurality of linear projections 42B and the plurality of circular projections 43A are opposed to each other is increased and the weld area in the overlapping portion 32A is increased accordingly. As a result, the welding strength of the overlapping portion 32A is enhanced. Furthermore, since part of the first insulating portion 32 which is melted in the ultrasonic welding is allowed to flow and then to solidify between the linear projections 42B and also between the circular projections 43A, the part of the melted portion of the first insulating portion 32 does not form a burr.

(3) With the overlapping portion 32A placed on the anvil portion 42A of the workbench 42, the linear projections 42B on the overlapping portion 32A extend in the extending direction of the bridge pieces 36. The overlapping portion 32A thus placed on the anvil portion 42A is not moved easily in the extending direction of the first insulating portion 32, as compared with the case in which the linear projections 42B are formed extending along the first insulating portion 32, with the result that variation in the welding strength of the overlapping portion 32A is prevented.

(4) The overlapping portion 32A is placed on the anvil portion 42A of the workbench 42 so that the non-weld area is present in the peripheral area of the overlapping portion 32A. Since the weld area and the non-weld area of the overlapping portion 32A have different hardnesses, there is a fear that the first insulating portion 32 may break at the boundary between the weld area and the non-weld area if such weld area and non-weld area co-exist in the peripheral area of the overlapping portion 32A. In this case, placing the overlapping portion 32A on the workbench 42 so that the non-welding area is present in the peripheral area of the overlapping potion 32A eliminates the boundary between the weld area and the non-weld area from the peripheral area. As a result, the first insulating portion 32 is less susceptible to breakage.

(5) The opposite ends of the first insulating portion 32 are overlapped with each other for a predetermined distance. The portion where the opposite ends of the first insulating portion 32 are overlapped with each other is ultrasonically welded to thereby form an overlapping portion 32A. Furthermore, in the present embodiment, each of the longer bridge pieces 36 is overlapped at one end thereof with the overlapping portion 32A and ultrasonically welded. Therefore, the overlapping portion 32A has a higher strength as compared with the overlapping portion 32A formed at a different position in the first insulating portion 32.

(6) The rotating electric machine M with wave winding that has a low pulsation (low vibration) characteristic is suitable for use in the electric compressor 10. In other words, the rotating electric machine M with the wave winding fulfills the low-noise, low-vibration and compactness requirements of the electric compressor 10. The electric compressor 10 using the rotating electric machine M with the wave winding is particularly suitable for use in a vehicle having the above demanding requirements.

(7) The part of the overlapping portion 32A where the liner projections 42B and the circular projections 43A are opposed to each other is melted to form the plurality of weld portions 53. As a result, the area including the weld portions 53 and the area including no weld portions 53 are formed in an alternating manner, so that the welding strength in the overlapping portion 32A is enhanced as compared with the case in which the weld portions such as 53 are formed locally in a particular area in the overlapping portion 32A.

(8) The provision of the plurality of the linear projections 42B on the upper surface of the anvil portion 42A of the workbench 42 helps to restrict the movement of the overlapping portion 32A relative to the anvil portion 42A. As a result, the ultrasonic welding of the overlapping portion 32A is performed efficiently.

It is to be noted that the present invention is not limited to the above-described embodiment, but it may be practiced in various ways as exemplified below.

In the above embodiment, at least one of the bridge pieces 36 is overlapped at one end thereof with the overlapping portion 32A and ultrasonically welded. However, the structure of the overlapping portion 32A is not limited thereto and may be such that the one ends of the bridge pieces 36 and the overlapping portion 32A do not overlap with each other.

In the embodiment, the weld portions 53 in the overlapping portion 32A may be formed extending so as to reach the opposite side edges E1, E2 spaced in the extending direction of the first insulating portion 32.

In the embodiment, the weld portions 53 in the overlapping portion 32A may be formed extending so as to reach the opposite side edges E3, E4 spaced in the extending direction of the bridge pieces 36.

In the embodiment, the solidified portions 51W may extend linearly in a direction across the extending direction of the bridge pieces 36.

In the embodiment, the ultrasonic welding apparatus 41 may dispense the anvil portion 42A. In this case, however, the linear projections 42B are formed on the upper surface of the workbench 42.

In the embodiment, the ultrasonic horn 43 may be placed on the outer peripheral surface of the overlapping portion 32A so that the center C is offset from the center of the overlapping portion 32A toward the side edge E1 or the side edge E2. Alternatively, the ultrasonic horn 43 may be placed on the outer peripheral surface of the overlapping portion 32A so that the center C is offset from the center of the overlapping portion 32A toward the side edge E3 or the side edge E4.

In the embodiment, the outer diameter H3 of the ultrasonic horn 43 may be smaller than the overlapping distance H2 of the overlapping portion 32A in the extending direction of the first insulating portion 32.

In the embodiment, the number of the circular projections 43A is not particularly limited.

In the embodiment, the number of the linear projections 42B is not particularly limited.

In the embodiment, the overlapping distance H2 of the overlapping portion 32A as measured in the extending direction of the first insulating portion 32 may be the same as or smaller than the width of the bridge pieces 36.

In the embodiment, hot welding may be used to connect the bridge pieces 36, 38 between the first insulating portions 32, 33 and the second insulating portions 34, 35, respectively.

In the embodiment, the electric compressors other than the scroll type compressor (for example, piston compressors) may be used for the electric compressor 10. In that case, the piston serves as the compression operation body.

What is claimed is:

1. A method for manufacturing an interphase insulating sheet of a rotating electric machine, the rotating electric machine being provided with a stator core and coils, the stator core having opposite ends in the axial direction thereof, a plurality of teeth therein and slots formed between adjacent teeth, the coils being inserted in the slots by wave winding and having coil ends extending out from the opposite ends of the stator core, the interphase insulating sheet of the rotating electric machine comprising a pair of insulating portions for providing phase-to-phase insulation between the coil ends and a plurality of bridge pieces each inserted in one of the slots and provided between the pair of insulating portions so as to connect therebetween, wherein each insulating portion is formed in an annular shape having an overlapping portion formed such that opposite ends of each of the insulating portions are located in an overlapping manner, the method comprising the steps of: holding the overlapping portion of each insulating portion between a workbench having a plurality of linear projections that are arranged parallel to each other and an ultrasonic horn having a plurality of circular annular projections that are arranged concentric to each other such that the linear projections and the circular annular projections are opposed to each other and intersect with each other, as viewed from directly above the ultrasonic horn and orthogonal to the workbench, wherein each of the linear projections intersects with one or more of the circular annular projections and wherein each of the circular annular projections intersects with one or more of the linear projections as viewed in the view from directly above the ultrasonic horn and orthogonal to the workbench; and ultrasonically welding the overlapping portion of each insulating portion, to form a plurality of intersecting portions.

2. The method for manufacturing the interphase insulating sheet of the rotating electric machine according to claim 1, wherein the step of ultrasonically welding comprises the step of flowing part of each of the insulating portions which is melted during the ultrasonic welding between the linear projections and between the circular annular projections and solidifying the flowed part of each of the insulating portions between the linear projections and the circular annular projections.

3. The method for manufacturing the interphase insulating sheet of the rotating electric machine according to claim 1, wherein the step of holding comprises the step of placing the overlapping portion on the workbench so that the linear projections extend in extending directions of the bridge pieces.

4. The method for manufacturing the interphase insulating sheet of the rotating electric machine according to claim 1, wherein the overlapping portion includes a weld area and a non-weld area, and the step of holding comprises a step of placing the overlapping portion on the workbench so that the non-weld area is present in a peripheral area of the overlapping portion.

5. The method for manufacturing the interphase insulating sheet of the rotating electric machine according to claim 1, wherein at least one of the bridge pieces is overlapped at one end thereof with the overlapping portion and ultrasonically welded.

* * * * *